(12) United States Patent
Bolt et al.

(10) Patent No.: US 7,639,609 B2
(45) Date of Patent: Dec. 29, 2009

(54) CONTROLLED INCREMENTAL MULTI-PROTOCOL LABEL SWITCHING (MPLS) TRAFFIC ENGINEERING

(75) Inventors: Gordon Bolt, Apex, NC (US); Edward A. Sykes, Cary, NC (US); Yu Liu, San Jose, CA (US)

(73) Assignee: OPNET Technologies, Inc., Bethesda, MD (US)

( * ) Notice: Subject to any disclaimer, the term of this patent is extended or adjusted under 35 U.S.C. 154(b) by 332 days.

(21) Appl. No.: 11/778,053

(22) Filed: Jul. 15, 2007

(65) Prior Publication Data
US 2008/0175150 A1    Jul. 24, 2008

Related U.S. Application Data

(60) Provisional application No. 60/807,708, filed on Jul. 18, 2006.

(51) Int. Cl.
*H04L 12/26*    (2006.01)
*G06F 15/177*    (2006.01)

(52) U.S. Cl. ............... 370/229; 370/237; 370/250; 370/252; 709/220; 709/223

(58) Field of Classification Search ............... None
See application file for complete search history.

(56) References Cited

U.S. PATENT DOCUMENTS 7,302,494 B2 * 11/2007 Hayashi et al. ............ 709/239
7,305,464 B2 * 12/2007 Phillipi et al. ............. 709/223
7,336,648 B1 * 2/2008 Sasagawa ................. 370/351
7,484,010 B2 * 1/2009 Sridhar et al. ............ 709/249
2006/0182034 A1 8/2006 Klinker
2007/0067351 A1 3/2007 Singh et al.

FOREIGN PATENT DOCUMENTS

WO    WO 02/03716 A    1/2002
WO    WO 2006/002665 A    1/2006

OTHER PUBLICATIONS

Bouillet. "Lightpath Re-Optimization in Mesh Optical Networks". IEEE/ACM Transactions on Networking, vol. 13, No. 2, Apr. 2005. http://portal.acm.org/citation.cfm?id=1066626.1066643.

* cited by examiner

*Primary Examiner*—Chi H Pham
*Assistant Examiner*—Soon-Dong D Hyun
(74) *Attorney, Agent, or Firm*—Robert M. McDermott, Esq.

(57) ABSTRACT

An existing network configuration is assessed, and potential changes to the existing configuration are identified that provide the greatest incremental improvements to the performance of the network. In a preferred embodiment, the user of the system identifies the maximum number (N) of changes that may be implemented in an existing network, and the system provides a set of possible reconfigurations, each requiring fewer than N changes. The user is presented a display of the potential improvement provided by each set as a function of the number of changes in the set, so that the relative incremental gain can be easily visualized. The objective function of the optimization may include conventional load-balancing objectives, or other objectives, such as a global minimization of path lengths.

31 Claims, 4 Drawing Sheets

| Source | Destination | P/S | L1 | L2 | L3 | L4 |
|---|---|---|---|---|---|---|
| Seattle | New York | P | SEA-CHI | CHI-NYC | | |
| | | S | SEA-SLC | SLC-KC | KC-DC | DC-NYC |
| Seattle | Atlanta | P | SEA-SLC | SLC-CHI | CHI-NYC | NYC-ATL |
| | | S | SEA-SF | SF-ATL | | |
| Houston | Chicago | P | HOU-CHI | | | |
| | | S | HOU-ATL | ATL-CHI | | |
| San Francisco | New York | P | SF-ATL | ATL-NYC | | |
| | | S | SF-SLC | SLC-CHI | CHI-NYC | |

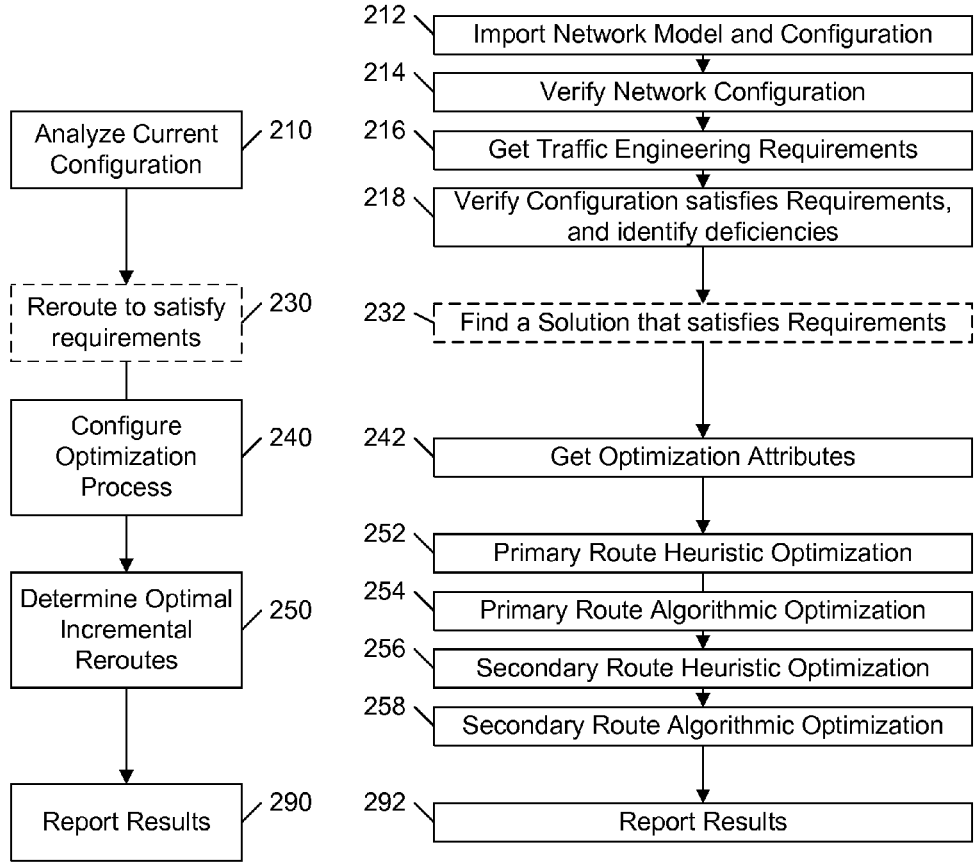
FIG. 2A
FIG. 2B
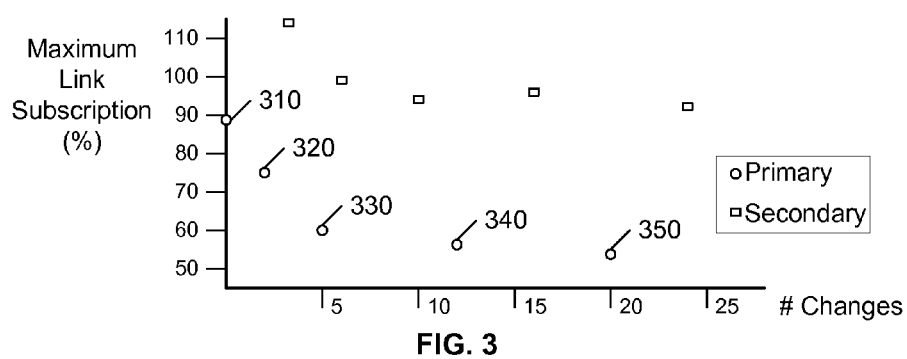
FIG. 3

US 7,639,609 B2

CONTROLLED INCREMENTAL MULTI-PROTOCOL LABEL SWITCHING (MPLS) TRAFFIC ENGINEERING

This application claims the benefit of U.S. Provisional Patent Application 60/807,708, filed 18 Jul. 2006.

BACKGROUND AND SUMMARY OF THE INVENTION

This invention relates to the field of traffic engineering, and in particular to the creation and maintenance of explicit routes for virtual circuits, such as Label-Switched Paths (LSPs), subject to routing and other network traffic constraints.

Traffic engineering generally includes the tasks of predicting the behavior of communications networks, and modifying the behavior as required to provide an efficient and effective use of resources throughout the network. Traffic Engineering includes the process of creating 'virtual circuits' between source and destination nodes in order to make efficient use of network resources, to satisfy routing constraints for the circuits, and to improve network survivability. In the field of Multi-Protocol Label Switching, for example, traffic engineering includes determining primary and secondary routes for Label Switched Paths (LSPs).

A variety of tools and techniques have been developed to identify optimal, or near-optimal, configurations of modeled networks. In the field of label switching network configurations, tools are available to align the requirements placed on defined communication paths (LSPs) between nodes of the network with the resources available in an existing or proposed network, and thereby identify near-optimal routes for these virtual circuits.

As networks become more and more complex, with dynamic changes occurring regularly, the actual optimization of a network's performance becomes a daunting and sometimes infeasible or impractical task. When a change or addition to a network is implemented, the truly-optimal use of this changed or added resource may require a change to dozens, or hundreds, of other network resources. In like manner, when a change or addition to the communication requirements or constraints is made, the truly-optimal solution may also require many changes to the network. Often, due to the risks of introducing unanticipated problems with each change, and the well recognized maxim of "if it isn't broken, don't 'fix' it", few, if any, of the ancillary changes are actually implemented. Because of these factors, and others, most real-world networks gradually become substantially different from their ideally optimized configuration.

Conventional optimization tools and techniques receive a model of the network, including the capabilities of each link, and a list of required circuits between nodes and their associated constraints. The conventional tools then apply one or more allocation schemes to determine a preferred route for each circuit so as to satisfy each of the constraints subject to the network capabilities. Unfortunately, the resultant preferred or optimal solution often has little correspondence to the current configuration of the network, and the number of changes required to implement the proposed solution makes such an implementation infeasible or impractical.

When a change is proposed to a network, such as the addition of a new virtual circuit, the conventional traffic engineering tools are used to facilitate identification of a configuration that satisfies the requirements for this new circuit, but these tools conventionally provide this 'incremental' solution by assuming that all previously defined circuits are locked, and the new routes for the new circuit must be found based on the currently available unsubscribed link capabilities. Alternatively, all previously defined circuits are not constrained to be locked, and a global optimization is performed. However, as noted above, such a global solution in a large network often requires an inordinate number of changes, and is rarely practical to implement.

Hybrid solutions are commonly used, wherein all explicitly routed circuits are constrained to be locked, but dynamically routed circuits, such as Constrained Shortest Path First (CSPF) routed circuits, are not constrained. In such a solution, the identified routes associated with the new circuit are explicitly added to the existing set of explicit routes, while all of the remaining changes associated with the dynamically routed circuits are ignored. Although these ignored changes are deemed irrelevant, because the originally routed circuits were unknown to begin with, the accumulation of sub-optimal solutions often leads to performance deficiencies that are difficult to isolate and correct.

If a solution for the new circuit cannot be found, the network manager may be required to manually delete previously explicitly routed circuits, in the hope of freeing-up subscriptions on links of the new circuit. However, most managers would consider such a hit-and-miss approach only as a last resort, and only if the new circuit has sufficient priority to warrant risking the introduction of problems on the deleted circuits, which had been working fine.

It would be advantageous to be able to identify a minimal number of changes required to provide a traffic engineering optimized solution to implement a proposed change to a network. It would be advantageous to be able to identify optimized performance-improvement changes to a network that do not, per se, require a substantial number of individual changes relative to the current configuration of the network. It would be advantageous to identify the possible performance-improvement changes that provide the best performance improvement per implemented change. It would be advantageous to be able to identify the degree of performance improvement achievable as a function of the total number of changes required to achieve each degree of performance improvement.

These advantages, and others, can be realized by a system and method that assesses an existing network configuration and identifies the potential changes to the existing configuration that provide the greatest incremental improvements to the performance of the network. In a preferred embodiment, the user of the system identifies the maximum number (N) of changes that may be implemented in an existing network, and the system provides a set of possible reconfigurations, each requiring fewer than N changes. Of particular note, the 'best' changes are defined without constraining all circuits to be locked, or all circuits to be unlocked. Existing circuits are 'preferably locked', but, unless otherwise indicated, can be changed if the change provides a definitive improvement. The objective function may include conventional load-balancing objectives, or other objectives, such as a global minimization of circuit route lengths. In the realm of label switching protocols, the existing network configuration may include a combination of explicitly routed label-switched paths, as well as those routed based on conventional dynamic inline routing protocols such as CSPF, OSPF, IS-IS, and so on. In a preferred embodiment, a graph of performance improvement(s) v. the number of changes is provided, so that the impact of implementing each set of changes can be visualized.

In a preferred embodiment of this invention, existing routes in the current configuration of the network for primary and/or secondary explicit routes are used, as are the existing routes for the circuits that are dynamically routed by Label- Switched Routers (LSRs), or other virtual circuit creation tools, rather than being explicitly routed. For example, Constrained Shortest Path First (CSPF) routes can be imported from the current operational network. Each circuit is tagged to identify the extent to which the circuit's current routes can be changed, and a limit to the total number of circuits whose routes may be changed during the incremental route optimization can be imposed.

This incremental traffic engineering optimization is particularly effective for applying additional constraints (delay constraints, subscription constraints, etc.) to an existing configuration and determining the minimal number of changes necessary to put the current configuration in compliance with these constraints. It is also particularly effective for adding new circuits to the configuration and determining the minimum number of re-routes necessary to support the new circuits, and for making topology changes (new links, link bandwidth changes, traffic engineering bandwidth and class type changes) and identifying a preferred set of circuits that should be re-routed based on these changes.

This invention also facilitates the task of incrementally migrating from dynamically routed network configuration to an explicitly routed configuration by identifying a subset of circuits whose re-routing will most improve the network performance.

This invention also facilitates improved network reliability by allowing network managers to plan for service interruption by identifying the set of circuits that are routed over a given network resource (node, link or shared-risk group) and generating a set of re-routed circuits with routes that avoid the resource. In like manner, secondary explicit routes for a circuit can be generated that are disjoint with respect to resources used in the existing primary explicit routes.

As noted above, this invention facilitates effective and efficient traffic engineering by re-optimizing a traffic engineering solution by identifying the circuits whose re-routing will most effectively improve the total network quality and/or performance, subject to existing and/or new constraints, including a limit on the number of permitted changes.

BRIEF DESCRIPTION OF THE DRAWINGS

The invention is explained in further detail, and by way of example, with reference to the accompanying drawings wherein:

FIGS. 2A and 2B illustrate example flow diagrams for providing incremental path improvements in accordance with aspects of this invention.

FIG. 3 illustrates an example display of achievable improvement as a function of the number of changes in accordance with aspects of this invention.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail. In like manner, although this invention is presented in the context of Multi-Protocol Label Switching (MPLS) traffic engineering, wherein performance improvements are identified as being achievable by changing primary and/or secondary Label-Switched Paths (LSPs), one of skill in the art will recognize that the techniques provided herein may be applicable to other network traffic engineering tasks as well, and the invention is not limited to the examples and context provided in this disclosure.

In the context of this invention, the terms 'optimal', 'optimize', and such, are used as they are commonly used in the field of network and traffic engineering. In this field, the term optimal indicates the most desirable alternative, based on the evaluation of a reasonable number of alternatives, within a reasonable amount of time. That is, in general, because the optimal path problem is generally NP-complete, the optimization process is performed subject to one or more stopping rules, and the 'optimal' solution is the best solution found thus far.

Figures 1A, 1B:
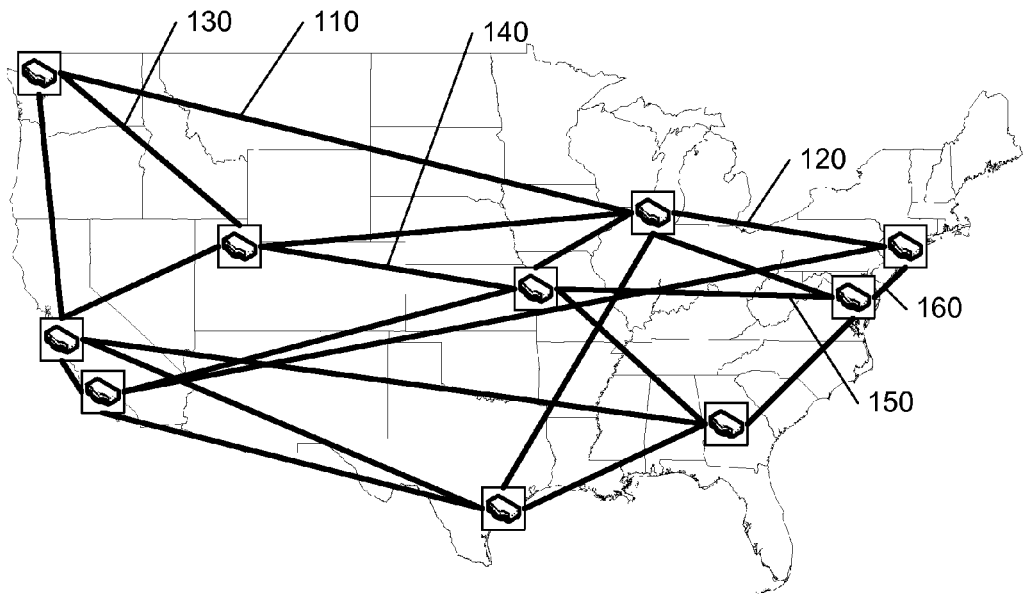
FIGS. 1A and 1B illustrate an example network diagram and corresponding example sets of primary and secondary Label-Switched Paths (LSPs) between given source and destination nodes.
Figure 4:
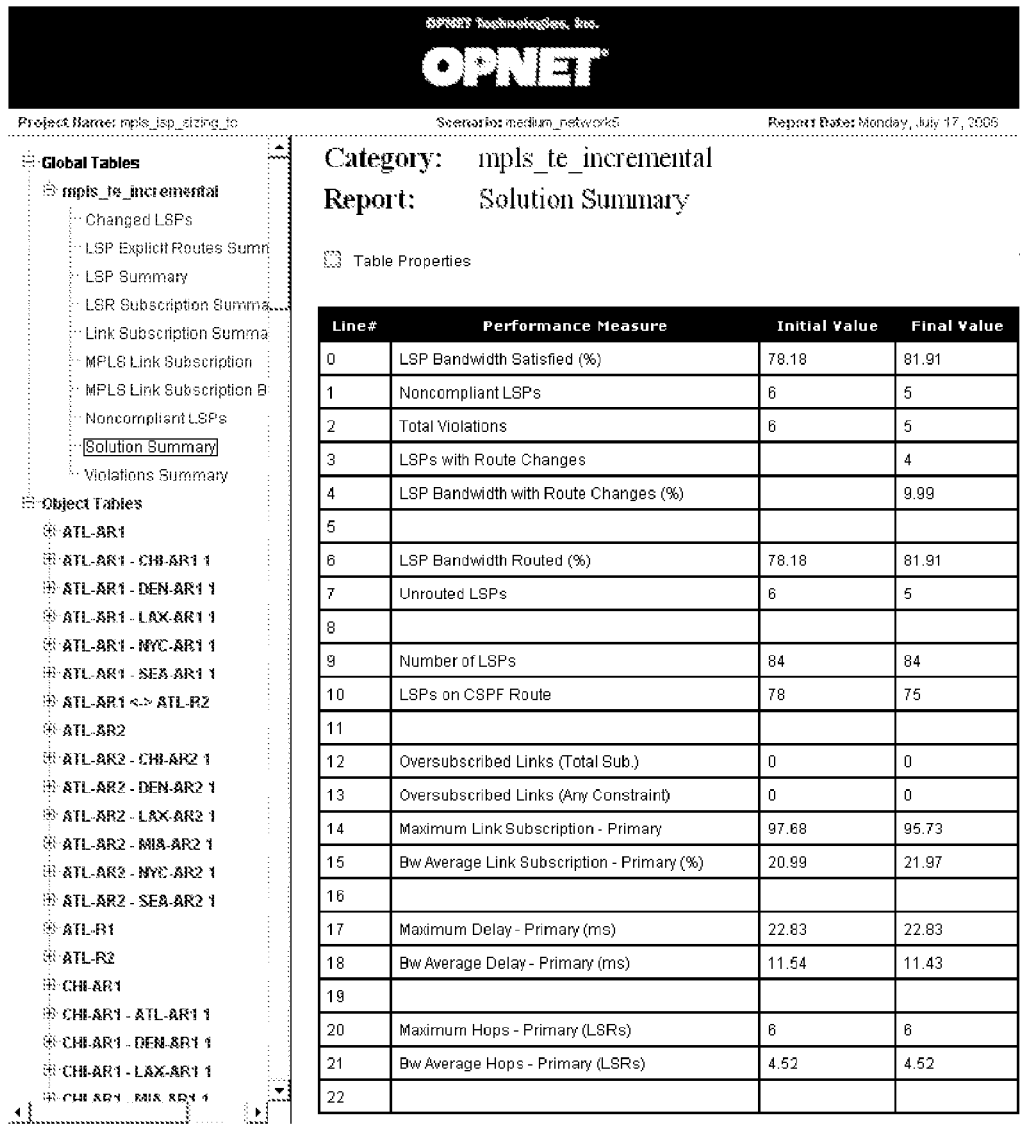
FIG. 4 illustrates an example display of before-and-after performance measures in accordance with aspects of this invention.

FIG. 1A illustrates an example network diagram that shows links 110, 120, etc. between nodes that are located at various geographic locations across the United States. Each of the links will have a given set of characteristics and capabilities, such as distance, delay, total bandwidth, bandwidth available for traffic engineering in aggregate and optionally specified per bandwidth pool or class type, and so on.

FIG. 1B illustrates a corresponding example collection of primary and secondary explicit routes for virtual circuits from identified source and destination nodes. For example, under normal network operation messages originating at Seattle that are destined for New York are routed using the virtual circuit's primary route via the link 110 from Seattle to Chicago, then via the link 120 from Chicago to New York. If problems are experienced with that primary route, the secondary route is activated and subsequent messages will be routed on the secondary route via the links from Seattle to Salt Lake City 130, Salt Lake City to Kansas City 140, Kansas City to Washington D.C. 150, and DC to New York 160. These routes are determined based on a set of requirements for each circuit, such as a minimum bandwidth in a given bandwidth class type or pool.

As each circuit subscribes to (is allocated to) a given set of links, the resources remaining available on each link for other circuits is correspondingly reduced. Unless care is taken in the allocation of links to each circuit, some links may become 'over-subscribed' and unable to satisfy the requirements of additional circuits that need to use these links. Ideally, the maximum subscription to any link on the network should be less than 100% of the link's capabilities and load should be balanced (if possible) throughout the network to avoid both highly congested links and very lightly loaded links. As noted above, algorithms and tools have been developed to facilitate traffic engineering by deriving sets of primary routes that minimize the maximum subscription to any link on the network, subject to a given set of constraints. These constraints typically address a maximum path delay, a maximum number of hops (links in route), and so on. These same algorithms are also used to derive sets of secondary routes, subject to additional diversity constraints that limit a circuit's secondary route's use of the links of the circuit's primary route. The secondary routes may also have relaxed constraints regarding path delay and the number of hops.

In accordance with one aspect of this invention, the optimization process of this invention can be configured to minimize the maximum link subscription, consistent with the conventional network engineering optimization tools. The minimization of the maximum link subscription has the effect of balancing the load across the links, subject to the circuit requirements and other constraints. Alternatively, the process can be configured to minimize the total amount of link subscription, subject to the circuit requirements and other constraints. The minimization of the total amount of link subscription has the effect of minimizing the number of hops, thereby minimizing path delays. A combination of these techniques may also be applied, wherein one of the parameters (maximum link subscription, total link subscription) can be set as a constraint while the other is set as the objective function, such as "minimize the total link subscription, subject to a maximum link subscription of 85%". One of skill in the art will recognize that other objective functions or (objective function, constraint) combinations may be defined without departing from the intention and scope of this invention.

FIG. 2A illustrates an example high-level flow diagram for a controlled incremental optimization of an existing network configuration. Initially, at 210, the current and/or proposed configuration is analyzed. That is, if a change to the configuration is proposed, the configuration is analyzed based on inclusion of the proposed change. The analysis identifies any requirements that are not satisfied in the current configuration.

Preferably, the subsequent optimization process starts with a feasible solution, so that a measure of performance improvement for subsequent changes can be determined, but this is not essential. Therefore, at 230, if there are any unsatisfied requirements, a set of changes are identified to bring the configuration into compliance. The process of finding such a set of changes is discussed further below with regard to block 250.

At 240, the user is provided the option of configuring the optimization process. Of particular note, the user is provided the option of constraining the solution to a maximum number of required changes to implement the solution. That is, the user can define an upper limit to the number of changes, above which any solution is deemed infeasible or impractical to implement. This forces the optimization process to limit its search to feasible/practical solutions, regardless of the fact that a 'better' solution may exist.

At 250, the optimization process is run. As detailed further below, in a preferred embodiment, a combination of heuristics and random searching is used to identify changes that will improve the network performance, subject to the circuit requirements and other constraints. Preferably, the primary routes are optimized before the secondary routes are optimized.

At 290, the results of the incremental optimization are presented to the user. A preferred form of presentation is illustrated in FIG. 3.

In FIG. 3, the achievable performance improvement is plotted as a function of the number of changes required to achieve that improvement. In this example, the performance measure is the maximum link subscription. The maximum link subscription is the maximum amount of subscribed bandwidth on any link, expressed as a percentage of the link's total available bandwidth. The link subscription is defined separately for the primary and secondary routes. The primary link subscription generally assumes no failures and therefore only primary routes are used. The secondary subscription for each link is generally the worst-case total subscription for the link over all of the considered failure cases (link, node or shared-risk group). The term 'total subscription' is often used synonymously with secondary subscription.

As illustrated at 310, in this example, the primary routing before optimization (zero changes) caused at least one link to have a link subscription of just under 90%. The graph illustrates, at 320, that if two changes are made, the maximum link subscription can be reduced to about 75%. If five changes are made, the maximum link subscription drops to 60%; twelve changes provide about 56%, and twenty changes provide about 54% maximum link subscription. The significance of this chart is apparent: by making as few as five changes, the maximum link subscription can be reduced by about 30%, whereas making as many as twenty changes provides a 36% improvement. That is, quadrupling the number of changes only provides a marginal improvement of 6% compared to the improvement realizable by making five changes.

As noted above, network managers generally prefer to make as few changes as possible on the network, due primarily to the risks of unforeseen problems arising with each change. By providing this visualization of performance improvement, the network manager can immediately see the effect each change will have, and can choose a preferred number of changes such that the improvement in performance warrants the risks associated with the changes. A change may be defined as the number of LSPs changed, the number of routes changed, the number of head-end label-switched routers (LSRs) whose configuration must be changed, and so on. In a preferred embodiment, other performance measures may be plotted as a function of these changes to further assist the user in selecting the tradeoff point between performance improvement and the associated risks. Additionally, the displayed graph is preferably interactive, so that the user can, for example, click on one of the displayed solution points 320, 330, etc. and, in response, the changes and other information associated with the selected solution will be displayed.

In a preferred embodiment of this invention, when the user identifies which change set is selected for implementation, the system provides a variety of reports corresponding to the solution provided by the selected set of changes. An example set of reports includes:

Solution Summary Report—a top-level report that provides high level summary statistics comparing the initial solution with the selected solution. The summary contains the objective function value, constraint values, details on the number of changes, and so on.

Violations Summary Report—a summary of the constraint violations for the initial and final solution.

Link Subscription Summary Report—summary of link subscription statistics comparing the initial and final solution.

LSP Summary Report—summary of the circuit statistics comparing the initial and final solution.

Change Report—a list of each circuit changed by the design action with a comparison between its original routes and its final routes.

Noncompliant LSP Report—a list of the Unroutable and Noncompliant circuits, and a basic failure reason for each (unroutable, unable to meet delay constraint, diversity constraint, locked on noncompliant route, etc.).

Oversubscribed Links Report—a list of the links that are oversubscribed, including reports for the total subscription and for each class type in the DS-TE case.

Explicit Route Summary—a list of summary statistics for the primary/secondary routes for each circuit.

MPLS Link Subscription (Bidirectional) report—a list of subscription information for each link (each link direction separately) in the MPLS topology.

Figure 5:
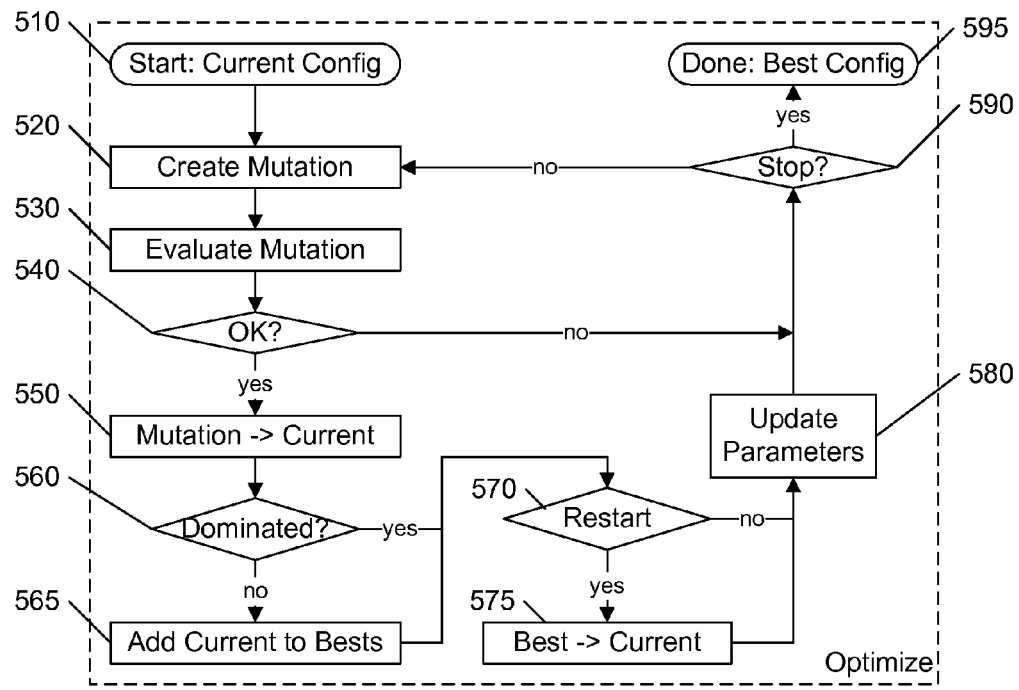
FIG. 5 illustrates an example flow diagram for a randomized search process in accordance with this invention.

A sample summary incremental change report is illustrated in FIG. 5. In a preferred embodiment, the display of each report is interactive, such that, for example, the selection of a summary field provides a display of the data underlying the summary information ("drilldown" to lower levels), and/or placing the cursor over a field provides a 'tool tip' that explains the field and the options available for analyzing that field. These and other features common to interactive displays will be evident to one of ordinary skill in the art.

In a preferred embodiment, the system also automatically provides a set of change orders and other information corresponding to the change set. Copending U.S. patent application Ser. No. 11/503,553, "INCREMENTAL UPDATE OF VIRTUAL DEVICES IN A MODELED NETWORK", filed 11 Aug. 2006 for Pradeep Singh, Raymond Onley, Nishant Gupta, and Alain Cohen, and incorporated by reference herein, teaches a technique for providing incremental changes to the configuration of modeled networks ("configlets") so that the assortment of network analysis tools commonly used can be used to assess the impact of such changes. In a preferred embodiment of this invention, the system will automatically produce the "configlets" corresponding to the configuration change required to implement the identified changes.

A more detailed example flowchart of a method of incremental circuit optimization is illustrated in FIG. 2B, corresponding to the higher level example flowchart of FIG. 2A.

At 212, the network model and the configuration of each virtual circuit in the network are obtained. Preferably, the configuration is obtained by querying each device in the network that contains such information, although other means of defining each virtual circuit may also be used, including obtaining the information from an existing database, simulating a model of the network to generate dynamic routes, prompting the user to enter the information, and so on. As noted above, all existing routes are preferably used to provide the initial state of the network, including both the explicitly routed circuits that are typically defined by the network manager, as well as the dynamically routed circuits that are automatically computed by label-switched routers (LSRs) that are specifically designed to include protocols for computing routes. If fewer than all the routes are obtained, the circuits with missing routes will be considered noncompliant and included in the change sets of the determined solutions.

The parameters that characterize each link, such as link bandwidth and delay, are also obtained at 212. Generally, this information is provided in the aforementioned network model. Because network links may be used for traffic other than that on the circuits being assessed, a preferred embodiment of this invention includes the option of reducing the link bandwidth due to these other demands. This reduction may be based on statistics derived from measured link loads in the actual network, simulation of a model of the network with this added traffic, traffic flow analysis, and so on. Optionally, the user may manually adjust the bandwidths of select links or groups of links.

Because the information that defines the network model and configuration information may be derived from multiple sources, the defined configuration is verified, at 214, to identify any errors. Conventional network configuration auditing tools, such as "Net Doctor", and routing analysis tools, such as Flow Analysis, provided by OPNET Technologies, Inc., may be used to check for configuration rule violations, conflicting routing protocols, and so on, as well as assuring that the routing and reachability information is as expected.

The traffic engineering requirements are obtained at 216. These requirements include, for example, the maximum allowable link subscription, path delay, and hop count, as well as diversity requirements between primary and secondary routes, and other constraints intended to assure reliable and efficient network operations. Of particular note, in a preferred embodiment, 'shared-risk' elements, elements that are likely to fail together, can be identified, and the enforcement of the diversity or other reliability requirements will treat each set of shared-risk elements as a single element. At 218, the configured system is inspected to verify that these requirements are met by the network model as configured, and any deficiencies are reported to the user.

If the existing network configuration does not satisfy the traffic engineering requirements, the user is given the option of finding a feasible solution, at 232. For ease of implementation, the same algorithms that are used to find optimal incremental solutions, discussed below, are used to find a feasible solution obtained by the minimum number of changes.

At 242, the optimization requirements and attributes are obtained. As discussed above, a particularly useful optimization requirement is a limit to the number of changes required to implement a proposed solution. And, as noted above, the user is given the option of selecting from among different objective functions to be optimized. Preferred objective functions include, at least, the minimization of maximum link subscription (load balancing), and the minimization of total subscribed bandwidth.

As discussed further below, the algorithms used to identify optimal change sets generally include parameters that affect, for example, how the search is conducted, bounds within which the solution must lie, time allowed for searching, and so on. These parameters will generally be dependent upon the particular set of optimization processes used. In like manner, the algorithms used for finding routes may include parameters, often termed cost-metrics, that affect which routes are provided as candidates to the optimization processes. For example, the 'cost' of each link may be defined in terms of geographic distance, number of hops, delay, or other metrics commonly used in network engineering, such as the IS-IS metric, OSPF cost, or TE link cost.

Additionally, the user is provided the option of identifying limits or other parameters that control the degree of change permitted at particular circuits, particular groups of circuits, and so on. For example, some circuits may be marked as locked, and changes to their routes will not be permitted. A circuit may be marked as "primary locked" indicating that the primary route is immutable while the secondary route may be changed. A circuit may have a portion of its route locked requiring certain resources to be used while the rest of the route is "loose". Similarly, a change-allowability rating may be assigned to each circuit or route, such that higher rated routes are more likely to be changed.

One of skill in the art will recognize that other requirements, constraints, attributes, and preferences that may affect the optimization process or the selection of changes that are provided to the optimization process may be included for user control as well.

In a preferred embodiment, the optimization process includes both heuristic 252, 256 and algorithmic 254, 258 processes for the primary and secondary routes. Typically, the same processes will be used for the primary and secondary routes, but with different constraints or parameters for each. As used herein, the term heuristic generally includes rules of thumb, simplifications, or educated guesses that reduce or limits the search for solutions. Heuristics do not necessarily guarantee optimal, or even feasible, solutions.

The heuristic processes 252, 256 are generally used to provide a pre-processing, or intelligent steering, of the subsequent algorithmic optimization processes 254, 258. Any of a variety of heuristics may be used, based on general principles of traffic engineering, 'tricks of the trade', and so on. For example, a particularly effective heuristic process for reducing the subscription on a link includes identifying the set of circuits routed over the link, 'scoring' of each these circuits based on its bandwidth demand and the number of oversubscribed links in its route, and selective rerouting of circuits based on this score. If oversubscribed links still exist, a plurality of routes are unrouted based on their circuit's score to provide a given amount of undersubscription on each link, and then conventional network routing optimization is applied to this partially routed network.

In like manner, routes that fail to meet their requirements (excess delay, etc.) are selectively rerouted to satisfy their requirements, even though this may require oversubscription to some links, and then the above rerouting and unrouting based on congestion is reapplied.

Preferably, after each iteration that provides a solution, each changed route is assessed to determine whether it can be restored to its original path without introducing oversubscriptions, requirement violations or (when in optimization mode) a lowering of the solution quality; if so, it is correspondingly restored, thereby reducing the number of changes. For each candidate solution, the total number of changes is compared with the specified limit. If the number of changes exceeds the specified limit, circuits are restored to their original routes until the limit is satisfied, even though this may result in oversubscriptions, requirement violations, or a decrease in solution quality.

The heuristic solution, or the original solution, if heuristics are not applied, is provided to the optimization algorithm 254, 258. Any of a variety of incremental optimization techniques may be applied, suitably configured to optimize the given objective function subject to the given constraints. Preferably, a randomized search technique is used, wherein various alternative configurations are iteratively generated and evaluated. At each iteration, the alternatives are either accepted or discarded based on the evaluation, and the accepted alternatives are used to generate subsequent alternative configurations. Each nondominated solution, with respect to number of changes, constraint violations and solution quality/objective function value, is considered to be a member of the set of best solutions. Each best alternative thus far is saved and the process continues. At some point, the process is restarted to avoid being trapped in a local optimum. Preferably, one of the best solutions is selected as the new starting point This repeated generation of best solutions continues until a specified stopping condition is reached, and the set of nondominated best solutions are presented to the user, at 292, discussed above with regard to FIG. 3.

A variety of randomized search techniques exist, including, for example, the simulated annealing technique, genetic and/or evolutionary algorithms, and the like. The simulated annealing technique has been found to be particularly effective in this application, and an example flow diagram is illustrated in FIG. 5.

The process starts, at 510, with a current configuration, typically the heuristic solution discussed above. At 520, the current configuration is mutated to provide an alternative that is based primarily on the current configuration, with select changes. A variety of techniques can be used to provide this mutation, and in a preferred embodiment, the user is provided options for using one or more mutation schemes.

In a first mutation scheme, a random number of circuits are selected to be unrouted, wherein the likelihood of selecting the circuit is based on its bandwidth size. In another mutation scheme, a random number of nodes are selected, and each route that originates or terminates at the nodes is unrouted. In a typical embodiment, a tradeoff is made between selecting a large number of routes to unroute, which requires more time, and selecting a small number of routes to unroute, which allows more solutions to be evaluated within an allocated optimization time. Generally, a large number of unrouted routes allows the system to derive a more optimal solution, but at the cost of typically requiring many changes. In a preferred embodiment, the user is provided the option of specifying an upper limit to the number of routes that may be unrouted. In the second mutation scheme, typically not more than 10% of the nodes are selected.

The selected circuits are then ordered based on their bandwidth size, with some randomization. The selected circuits are then rerouted in the given order, using a constrained shortest route selection function. One such method uses a shortest route selection variation that encourages load balancing by discounting the path weight on lightly loaded paths or by adding a premium to the path weight on highly loaded paths The resultant mutation, comprising a combination of the routes in the current configuration and these rerouted routes, is evaluated at 530. The evaluation is primarily based on the given objective function, although additional criteria, such as a penalty score based on the number of changes, the number of oversubscribed links, and so on, may also be used.

The resultant evaluation score is used to determine whether to use this mutation as the next current configuration, or to generate another mutation based on the existing current configuration, at 540. If the mutation is better than the current configuration, it is selected as the next current configuration, at 550, however, not all poorer mutations are necessarily rejected. In the simulated annealing process, the likelihood of a poorer mutation being accepted as the next current configuration decreases with each iteration, and with the magnitude of the difference in evaluation scores.

At 560, the current configuration is compared to prior 'best' configurations. If this configuration is not dominated, with respect to number of changes, constraint violations and solution quality/objective function value, or other criteria, it is saved as one of the best configurations found thus far, at 565.

At 570, the process determines whether it should restart or continue with the above iteration process. Generally, this determination is based on the number of iterations. In a typical embodiment, a tradeoff is made between the number of iterations between restarts and the number of restarts within an allotted optimization time. If the process is restarted, the current best configuration is used as the new current configuration, at 575. Because the mutation process at 520 includes random selection, the re-use of this configuration is not likely to cause a re-generation of the same subsequent mutations.

At 580, the parameters of the process are updated, including, for example, reducing the aforementioned likelihood of accepting a poorer mutation.

At 590, a determination is made as to whether to stop the process. The stopping rule, or rules, can be based on a variety of factors. In a preferred embodiment, the process stops when a maximum time has elapsed, or a maximum number of cycles, or if a better solution has not been found after a given number of cycles. Additionally, as mentioned above with regard to block 232 of FIG. 2B, this process is used to both fix the original configuration and to optimize the original configuration; when used in the fix mode, the stopping rule includes stopping when the new current configuration satisfies all of the given constraints and requirements, regardless of its evaluation score, and, optionally, regardless of the number of changes required.

Figure 6:
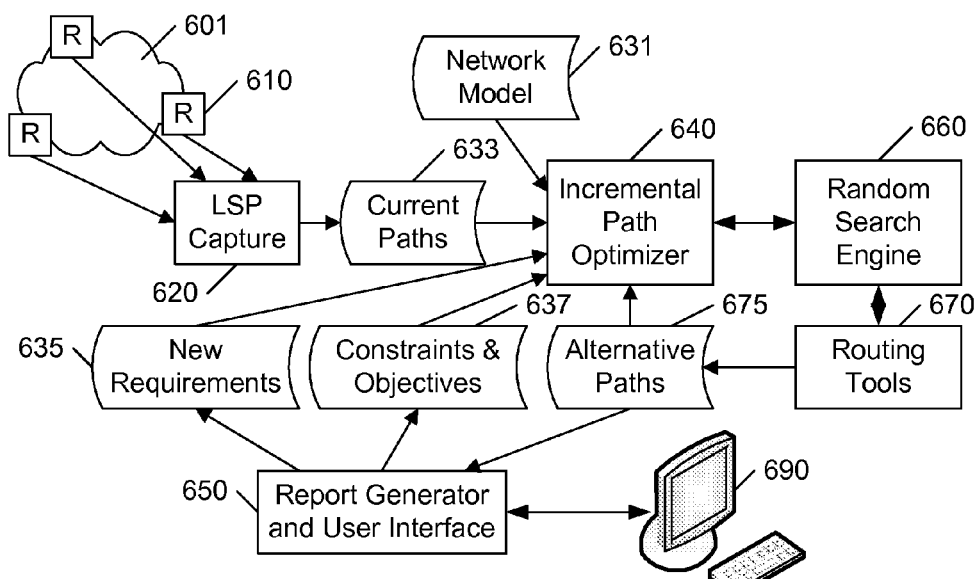
FIG. 6 illustrates an example block diagram of a controlled incremental optimization system in accordance with this invention.

FIG. 6 illustrates an example block diagram of an incremental label-switched network optimization system. An existing network 601 includes a plurality of devices 610 at which a plurality of label-switched paths are used to route traffic between source and destination nodes. The network 601 is modeled in a network model database 631, and the label-switched paths are defined in a current paths database 633. Some or all of the defined current paths are obtained from the network 601 via a path capture element 620, which queries the network devices 610 for the paths stored at each device. The term database is used herein in the general sense of a storage of information that facilitate selective retrieval of the information; each database may be on the same storage device, different storage devices, or multiple storage devices, and may be structured as subsets of larger databases, or collections of smaller databases.

A user interface 650 facilitates user interaction 690 with the elements of the optimization system, and particularly facilitates the import of new requirements 635, such as the addition or change of network devices, additions and changes to defined paths, and the import of constraints and objectives 637 related to the optimization and/or routing processes, as discussed above.

An incremental path optimizer 640 is configured to receive the various inputs 631, 633, 635, 637, and to produce therefrom one or more optimized traffic engineering solutions, subject to the given constraints. Of particular note, the path optimizer 640 is configured to start with the currently defined paths as an initial state, from which a set of changes are defined to achieve each optimized solution. Preferably, the optional constraints 637 include the setting of an upper limit to the number of changes required, as discussed above.

The path optimizer 640 is configured to selectively reroute paths, and to unroute groups of paths to facilitate such rerouting, using conventional routing tools 670. Each derived solution set of alternative paths 675 is evaluated by the path optimizer 640, and preferred paths are stored for subsequent reporting to the user. In a preferred embodiment, the path optimizer 640 uses a combination of heuristic and algorithmic optimization processes. Preferably, the system includes a randomized search engine, such as a simulated annealing search engine that, in conjunction with the routing tools 670, generates sets of alternative paths 675 for consideration by the path optimizer 640.

Upon completion of the optimization process, typically based on an elapsed time and/or an inability to further improve the solution, the path optimizer 640 provides the saved alternative paths to the report generator/user interface 650 for presentation to the user. As noted above, in a preferred embodiment, the user is provided an illustration of the improvement achievable by each solution as a function of the number of changes required to implement the solution, from which the user selects a particular solution and its associated change set. The report generator 650 then produces detailed and summary reports based on the selected solution.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

j) software portions may be stored on non-transitory computer readable media.

We claim:

1. A method comprising:
    obtaining, at a network analysis system:
        a model of a network that includes links between nodes of the network,
        a current configuration of the network that includes a plurality of virtual circuits,
        one or more constraints related to the virtual circuits, and
        one or more objectives relative to optimizing the virtual circuits;
    selectively unrouting a plurality of selected routes associated with one or more of the virtual circuits, the plurality of routes being substantially fewer than a totality of the routes associated with the plurality of virtual circuits;
    rerouting, by the network analysis system, the plurality of the routes to produce a modified set of virtual circuits;
    evaluating the modified set based on the one or more objectives, subject to the one or more constraints;
    repeating the selective unrouting, rerouting, and evaluating to provide a plurality of modified sets of virtual circuits;
    selecting, by the network analysis system, one or more preferred modified sets for presentation to a user based on an evaluation of each of the plurality of modified sets; and
    presenting, by the network analysis system, a measure based on the evaluation of each of the preferred modified sets as a function of a number of changes in the set relative to the current configuration of the network.

2. The method of claim 1, wherein the plurality of selected routes are selected based on a random process.

3. The method of claim 1, wherein the number of changes in each set includes at least one of:
- a number of circuits changed,
- a number of routes changed, and
- a number of devices whose configuration must be changed.

4. The method of claim 1, wherein each of the one or more preferred modified sets of virtual circuits includes a number of changes relative to the current configuration of the network, and
- the selecting of the one or more preferred modified sets is based on the number of changes in each of the sets.

5. The method of claim 4, including setting an upper limit to the number of changes in each modified set of virtual circuits.

6. The method of claim 1, wherein the plurality of virtual circuits include explicitly defined virtual circuits and dynamically defined virtual circuits.

7. The method of claim 1, including:
- selectively unrouting one or more of the routes based on a heuristic process; and
- rerouting the one or more routes to produce a first modified set of virtual circuits.

8. The method of claim 7, wherein the heuristic process includes identifying routes to be unrouted based on the virtual circuits routed over an oversubscribed link and a total number of oversubscribed links traversed by the route.

9. The method of claim 8, wherein the heuristic process includes identifying routes to be unrouted based on the paths routed over an oversubscribed link and a product of the total number of oversubscribed links traversed by the route and a subscription bandwidth associated with the route.

10. The method of claim 7, wherein the heuristic process includes identifying routes to be unrouted based on a failure of the route to satisfy one or more of the constraints.

11. The method of claim 1, wherein the objective includes a minimization of a maximum link subscription.

12. The method of claim 1, wherein the objective includes a minimization of a total amount of subscribed bandwidth.

13. The method of claim 1, wherein the selective unrouting and evaluating are based on a method of simulated annealing.

14. The method of claim 1, wherein the selective unrouting and evaluating are based on a genetic/evolutionary algorithm.

15. The method of claim 1, including:
- receiving a selection of a chosen set from the one or more preferred modified sets, and
- providing one or more reports that are configured to contrast a new configuration based on the chosen set from the current configuration.

16. A system comprising:
- an path optimizer that is configured to:
  - receive:
    - a model of a network that includes links between nodes of the network,
    - a current configuration of the network that includes a plurality of virtual circuits,
    - one or more constraints related to the virtual circuits, and
    - one or more objectives relative to optimizing the virtual circuits;
  - selectively unroute a plurality of selected routes associated with one or more of the virtual circuits, the plurality of routes being substantially fewer than a totality of the routes associated with the plurality of virtual circuits;
- a router that is configured to reroute the plurality of the routes to produce a modified set of virtual circuits; and
- a report generator;
wherein
- the path optimizer is further configured to:
  - evaluate the modified set based on the one or more objectives, subject to the one or more constraints; and
  - repeat the selective unrouting, rerouting, and evaluating to provide a plurality of modified sets of virtual circuits; and
  - select one or more preferred modified sets of the plurality of modified sets for presentation to the user, based on an evaluation of each of the plurality of modified sets; and
- the report generator is configured to present a measure based on the evaluation of each of the preferred modified sets as a function of the number of changes in the set relative to the current configuration.

17. The system of claim 16, including a random search engine that is configured to select the plurality of selected routes.

18. The system of claim 16, wherein the number of changes in each set includes at least one of:
- a number of circuits changed,
- a number of routes changed, and
- a number of devices whose configuration must be changed.

19. The system of claim 16, wherein each of the one or more preferred modified sets of virtual circuits includes a number of changes relative to the current configuration of the network, and
- the path optimizer is configured to select the one or more preferred modified sets based on the number of changes in each of the sets.

20. The system of claim 19, wherein the path optimizer is configured to set an upper limit to the number of changes in each modified set of virtual circuits.

21. The system of claim 16, wherein the plurality of virtual circuits include explicitly defined virtual circuits and dynamically defined virtual circuits.

22. The system of claim 16, wherein the path optimizer is configured to selectively unroute one or more of the routes based on a heuristic process.

23. The system of claim 22, wherein the heuristic process includes identifying routes to be unrouted based on the virtual circuits routed over an oversubscribed link and a total number of oversubscribed links traversed by the route.

24. The system of claim 23, wherein the heuristic process includes identifying routes to be unrouted based on the paths routed over an oversubscribed link and a product of the total number of oversubscribed links traversed by the route and a subscription bandwidth associated with the route.

25. The system of claim 22, wherein the heuristic process includes identifying routes to be unrouted based on a failure of the route to satisfy one or more of the constraints.

26. The system of claim 16, wherein the objective includes a minimization of a maximum link subscription.

27. The system of claim 16, wherein the objective includes a minimization of a total amount of subscribed bandwidth.

28. The system of claim 16, wherein the selective unrouting and evaluating are based on a method of simulated annealing.

29. The system of claim 16, wherein the selective unrouting and evaluating are based on a genetic/evolutionary algorithm.

30. The system of claim 16, including a user interface that is configured to:

receive a selection of a chosen set from the one or more preferred modified sets, and provide one or more reports that are configured to contrast a new configuration based on the chosen set from the current configuration.

31. A non-transitory computer readable storage medium that includes a computer program that, when executed by a processing system, causes the processing system to:

receive:
- a model of a network that includes links between nodes of the network,
- a current configuration of the network that includes a plurality of virtual circuits,
- one or more constraints related to the virtual circuits, and
- one or more objectives relative to optimizing the virtual circuits;

selectively unroute a plurality of selected routes associated with one or more of the virtual circuits, the plurality of routes being substantially fewer than a totality of the routes associated with the plurality of virtual circuits; and reroute the plurality of the routes to produce a modified set of virtual circuits;

evaluate the modified set based on the one or more objectives, subject to the one or more constraints; and repeat the selective unrouting, rerouting, and evaluating to provide a plurality of modified sets of virtual circuits;

select one or more preferred modified sets of the plurality of modified sets, based on an evaluation of each of the plurality of modified sets; and present a measure based on the evaluation of each of the preferred modified sets as a function of the number of changes in the set relative to the current configuration.

* * * * *